United States Patent [19]
Ersoy

[11] Patent Number: 5,689,996
[45] Date of Patent: Nov. 25, 1997

[54] SHIFTING MEANS FOR AN AUTOMATIC TRANSMISSION IN A MOTOR VEHICLE

[75] Inventor: Metin Ersoy, Walluf, Germany

[73] Assignee: Lemförder Metallwaren AG, Lemförde, Germany

[21] Appl. No.: 597,041

[22] Filed: Feb. 5, 1996

[30] Foreign Application Priority Data

Jul. 17, 1995 [DE] Germany .................. 195 26 059.7

[51] Int. Cl.⁶ .................................................. F16H 59/02
[52] U.S. Cl. ........................... 74/335; 74/473 R; 74/475
[58] Field of Search ..................... 74/335, 473 R, 74/475

[56] References Cited

U.S. PATENT DOCUMENTS

| | | | |
|---|---|---|---|
| 4,987,792 | 1/1991 | Mueller et al. | 74/473 R |
| 5,044,220 | 9/1991 | Raff et al. | 74/473 R |
| 5,509,322 | 4/1996 | Anderson et al. | 74/335 |

FOREIGN PATENT DOCUMENTS

| | | |
|---|---|---|
| 0 624 741 A1 | 4/1994 | European Pat. Off. . |
| 37 17 675 C2 | 12/1988 | Germany . |
| 38 07 881 C2 | 9/1989 | Germany . |
| 40 05 588 C2 | 9/1991 | Germany . |

*Primary Examiner*—Allan D. Herrmann
*Attorney, Agent, or Firm*—McGlew and Tuttle

[57] ABSTRACT

A shifting device for an automatic transmission of a motor vehicle, in which a selector lever is pivotable within a shift gate around a selection axis located deeper than the said shift gate and is held by spring forces acting at right angles to the longitudinal direction of the shift gate against locking elements. The locking elements are laterally offset in relation to one another and are associated with the shift positions, in the shift positions P, R, N, and D. The selection axis of the selector lever is mounted in a universal joint-like manner in an intermediate part. The intermediate part is mounted pivotably around the selection axis on a housing that is a rigid part of the body, and—in the auxiliary shift position (M) for stepwise, manual shifting in the shift position (D) associated with automatic shifting—the selector lever is pivotable manually in relation to the intermediate part around a drag bearing located higher than the selection axis in the direction of the selection movement. The arrangement allows bridging over shift contacts for the stepwise shifting of the gears of the transmission.

8 Claims, 6 Drawing Sheets

Automatic Position

SHIFTING MEANS FOR AN AUTOMATIC TRANSMISSION IN A MOTOR VEHICLE

FIELD OF THE INVENTION

The present invention pertains to a shifting device for an automatic transmission in a motor vehicle in which a selector lever is pivotable within a shift gate around a selection axis located deeper than the shift gate, and the selector lever is held against locking devices, which are located laterally offset relative to one another and are associated with the shift positions, by spring forces acting at right angles to the longitudinal direction of the shift gate in the shift positions (P, R, N, D), and is pivotable manually by electric switches in a shift position associated with the automatic shifting for the stepwise shifting of the gears of the transmission.

BACKGROUND OF THE INVENTION

A shifting device having these features has been known from EP 0 624 741-A1. The gearshift lever is continuously tensioned in the transverse direction here, and it is held in the shift positions P, R, and N against locking means of the shift gate. In the shifting position D associated with automatic shifting, the gearshift lever is located between two elastic plate elements, which cooperate with an electric switch each, so that manual shifting of the gears in one direction or another is possible by moving the gearshift lever in a special gap within the shift gate. The gearshift lever now moves in a side gap located laterally next to the main gap, as it has been known from DE 37 17 675 -C2 or DE 38 07 881 -C2 and other documents. A shifting device for an automatic transmission with a manual gear selector with only one, essentially straight shifting gap in the shift gate is shown in DE 40 05 588 -C2.

SUMMARY AND OBJECTS OF THE INVENTION

In contrast, the primary object of the present invention is to improve a shifting device of the type described in the introduction such that the range of automatic shifting and the manual shifting are clearly separated from one another.

This object is attained according to the invention with a shifting device for an automatic transmission of a motor vehicle, in which a selector lever is pivotable within a shift gate around a selection axis located below the shift gate. The selector lever is held against locking means, which are located laterally offset relative to one another and are associated with the shift positions, by spring forces acting at right angles to the longitudinal direction of the shift gate in the said shift positions (P, R, N, D). The selector lever is pivotable manually by means of electric switches in a shift position associated with the automatic shifting for the stepwise shifting of the gears of the transmission. The selection axis of the selector lever is mounted in an intermediate part in a universal joint-like manner, and the intermediate part is pivotably mounted on a housing which is a rigid part of the body. The selector lever is manually pivotable—in an auxiliary shift position (M) of the shift position (D) associated with the automatic shifting—around a drag bearing located higher than the selection axis in the direction of the selection movement for bridging over switching contacts for the stepwise shifting of the gears of the transmission in relation to the said intermediate part.

Contrary to prior-art shifting device for automatic transmissions with manual gear selector, the gears associated with the automatic shifting are selected, due to the features of the present invention, via the intermediate part by pivoting the selector lever in the shift gate, and a transmission gear is selected manually by pivoting the selector lever in relation to the intermediate part. Thus, different components are moved around different pivot axes relative to one another for the selection movements of the shift positions associated with the automatic shifting, on the one hand, and for the movements for the manual shifting of a gear, on the other hand. The selector lever in the shift position associated with the automatic shifting is preferably pivotably locked in the shift gate, and it engages with its lower end a sliding block of the intermediate part at right angles to the direction of the selection movement in order to make possible a pivoting movement of the selector lever in relation to the intermediate part. A yoke-shaped design is recommended for the intermediate part, so that the yoke with its legs can be mounted pivotably around selection axis on a fixed housing, wherein the yoke has a slot in its web connecting the legs to one another at the top end, and the slot extends at right angles to the selection movement and is passed through by the selector lever, which engages, with its lower end, under the selection axis, a slot of a sliding block connected to the yoke in a slot extending at right angles to the selection movement. In the shift position associated with the automatic shifting, the selector lever engages, with its lower end, a transverse slot of the sliding block, so that the selector lever, which is pivotable in the transverse slot of the yoke web around its pivotable locked position, is movable with its lower end in the transverse slot in relation to the yoke.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
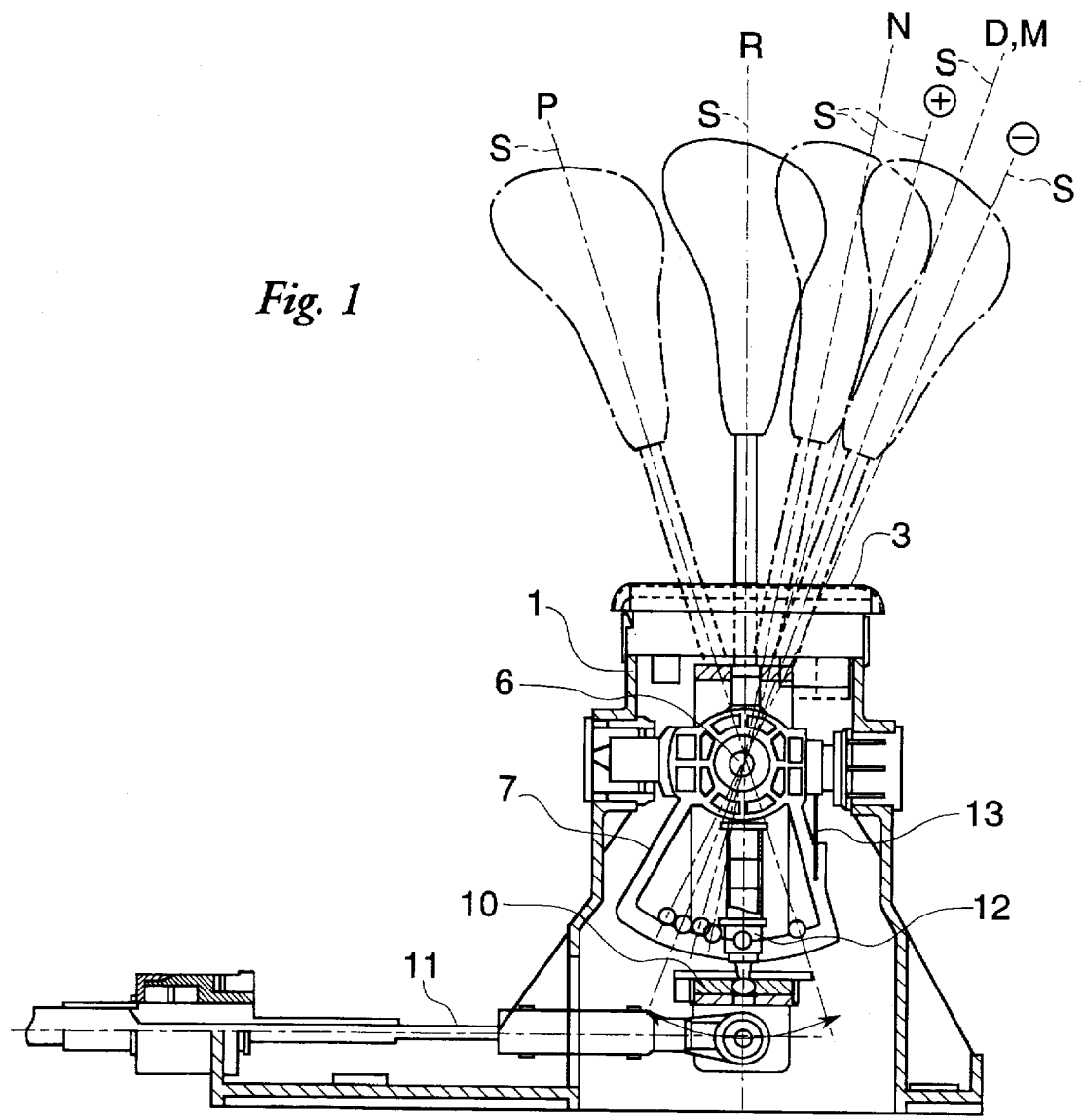
FIG. 1 is a vertical longitudinal sectional view through a shifting device possessing the features of the present invention.

The shifting device is arranged in a dome-shaped housing 1, which can be placed on an opening of a transmission tunnel or the like. The selector lever 2 passes through a stepped shift gate 3 arranged on the top side of the housing 1 and is mounted movably around a transverse axis 4 under this shift gate 3 in an intermediate part 5. The selector lever 2 has a central selection axis 5. The intermediate part 5 is in turn mounted movably around a pivot axis 6 arranged coaxially to the transverse axis in the dome-shaped housing 1. To mount the selector lever 2 in the intermediate part 5, a crosspiece 7 made of a material having limited elasticity is provided, defining universal joint mounting means so that the selector lever 2 is cardanically movable within predeterminable limits in relation to the intermediate part 5. To make possible a tilting movement of the selector lever 2 in relation to the selection axis of the crosspiece 7, it is also possible to provide a rubber mount between the selector lever 2 and a crosspiece 7, wherein this rubber mount may possibly have recesses in order to achieve a softer design in an axial direction of the crosspiece than in the other axial direction. Instead of such an elastic connection between the selector lever 2 and the crosspiece 7, other spring elements, especially mechanical springs, may also be used, so that restoring forces for the automatic return into the middle position are built up during the tilting movement of the selector lever together with the intermediate part 5. A leg spring 13 arts as a spring force means for pressing the selector lever 2 in the shift positions P, R, N, and D on one side against locking means in the form of receiving locations formed in a base of crosspiece 7. These locations form one part of the locking means with spring loaded locking component 12 forming the other portion of the locking means. The receiving locations of crosspiece 7 correspond with locations provided by the stepped design of the shift gate 3. The intermediate part 5 has a yoke-shaped design in the example, so that it is mounted movably in drag bearings around the pivot axis 6 with its two mutually parallel legs in the housing 1. A slot (or yoke slot) 8, which extends at right angles to the longitudinal direction of the shift gate 3, and through which a rod-shaped part of the selector lever 2 passes with a small clearance in the longitudinal direction of the shift gate 3, is provided in the web which connects the legs to one another on the top side. The lower end of the selector lever 2 engages a transverse slot 9 of a sliding block 10, which is rigidly connected to the lower free leg ends of the intermediate part 5. The shifting device is installed in the conventional manner, such that the pivoting movement of the selector lever 2 for selecting the shift positions P, R, N, and D takes place essentially in a plane extending in the longitudinal direction of the vehicle. The manual selection of a gear is performed by the pivotably movable locking of the selector lever in the shift gate 3 in shift position D by a slight lateral pivoting movement of the selector lever 2 in the transverse direction into the auxiliary shift position M and by a subsequent movement in the direction of the only shift gap. The intermediate part 5 is carried by the selector lever 2 and is pivoted around the pivot axis 6 during the selection of the shift positions P, R, N, and D, and these pivoting movements of the intermediate part can be transmitted in the conventional manner via transmission connection means linkages, cables 11 or the like, which are connected to the intermediate part 5 in an articulated manner. The intermediate part 5 is locked by an electromagnet 14 in the auxiliary shift position M associated with the manual shifting, so that a pivoting of the selector lever 2 takes place around the axis 6 in relation to the intermediate part 5 during a movement of the selector lever 2 in a plane parallel to the longitudinal direction of the shift gate 3, as is shown graphically in FIG. 2. This pivoting movement is made possible by the transverse slot 9 in the sliding block 10, and it is used to establish shifting contacts (or switching contacts) for the manually triggered shifting into a next higher or next lower gear, as it is known.

Figure 2:
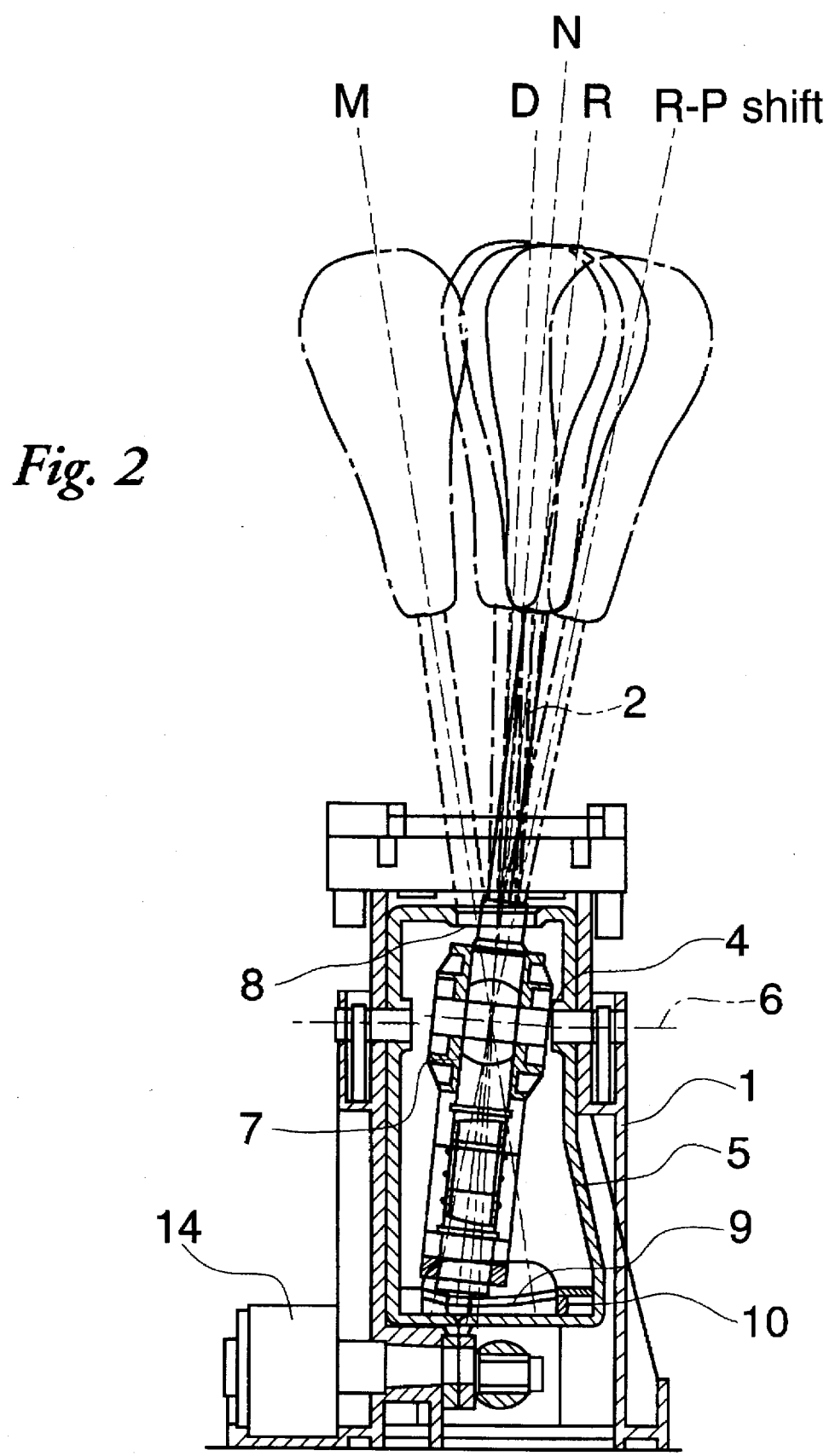
FIG. 2 is a cross sectional view rotated by 90° in relation to FIG. 1.
Figure 3:
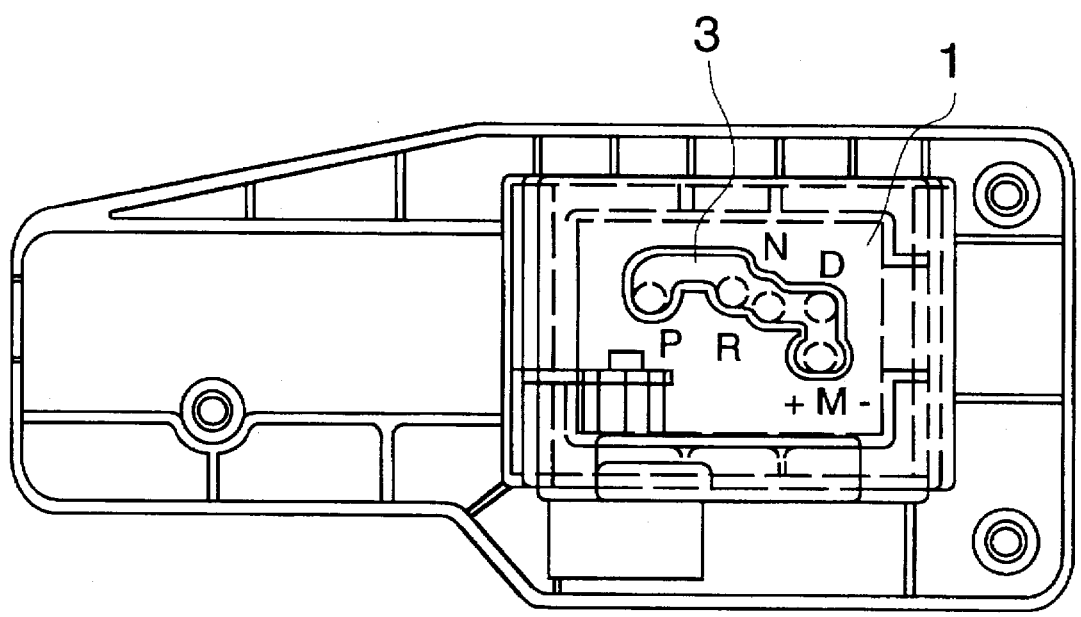
FIG. 3 is a top view of the housing of the shifting device without the selector lever.

FIG. 1 also shows that the locking means includes the additional spring-loaded component 12 for the shift positions P, R, N, and D with the auxiliary shift position M. In the embodiment of FIGS. 1, 2 and 3, the selector member coupling means includes the electromagnet 14 (for immobilizing the intermediate part 5) and the provision of the sliding block 9 also contributes to this function (allowing movement of the lever for the manual, step-like shifting).

Figure 4:
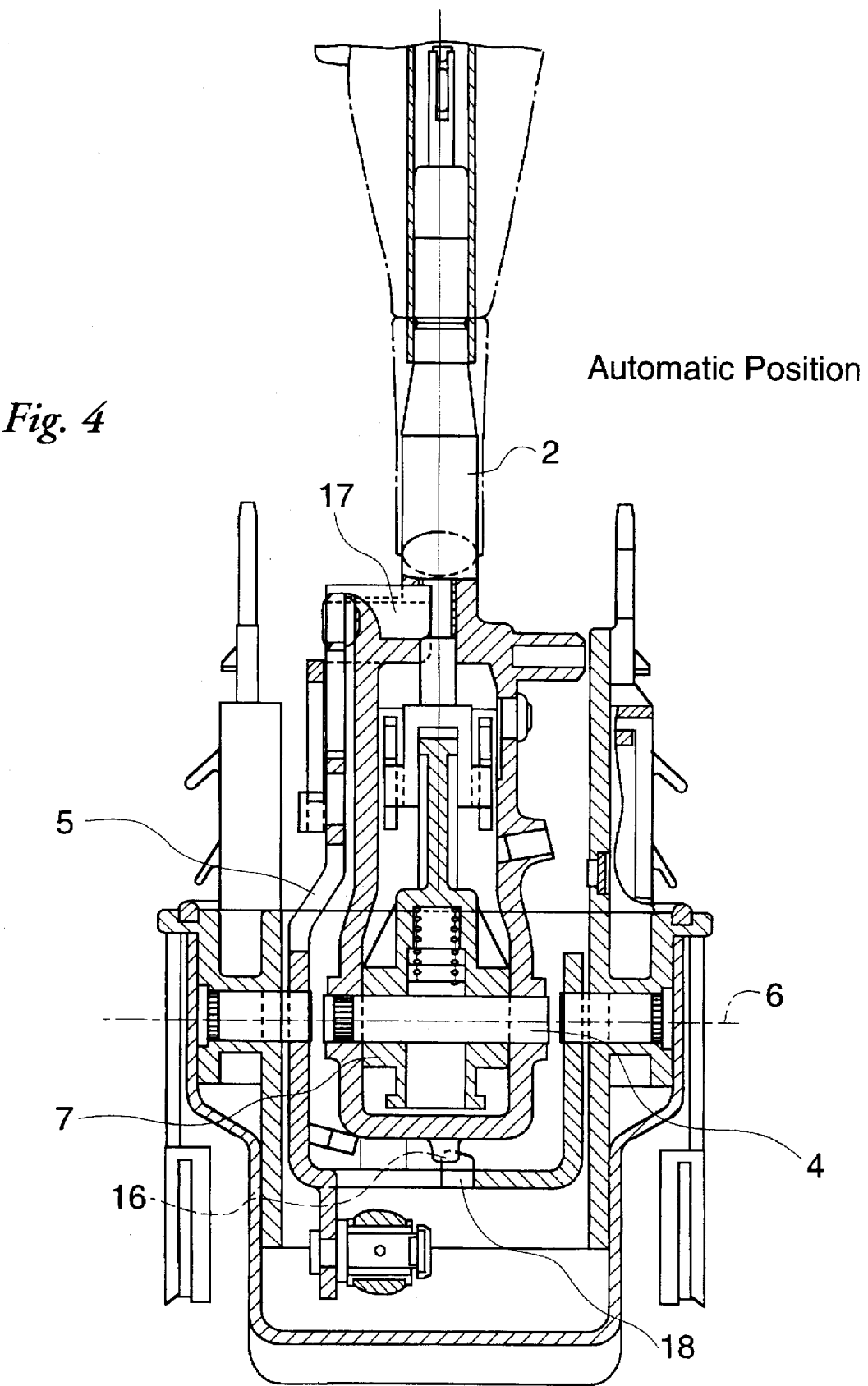
FIG. 4 is a cross sectional view corresponding to FIG. 2 through a modified exemplary embodiment.
Figure 5:
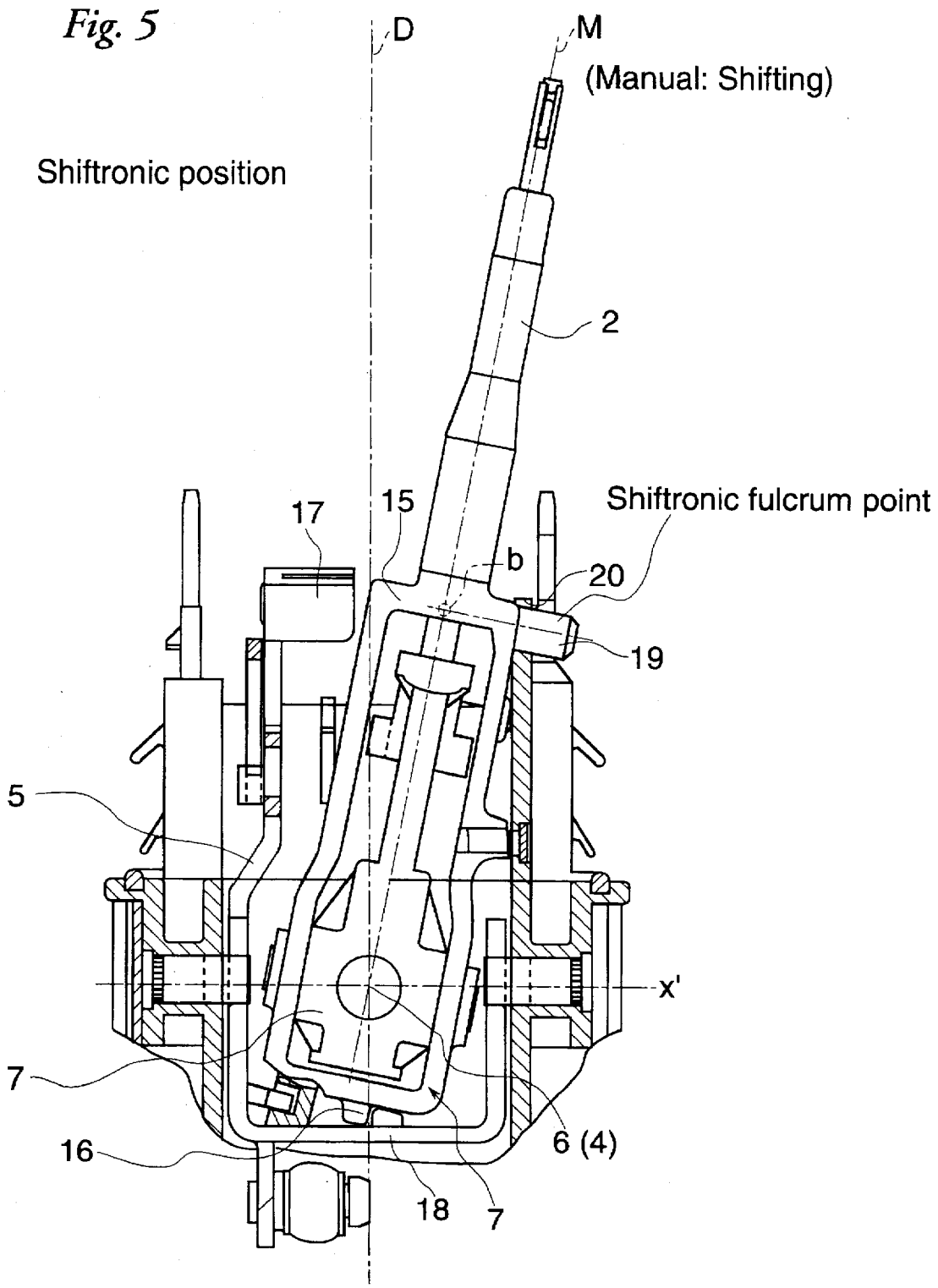
FIG. 5 is a representation of the arrangement in FIG. 4, partially in a side view and partially as a sectional view through the housing in the tilted position of the selector lever.
Figure 6:
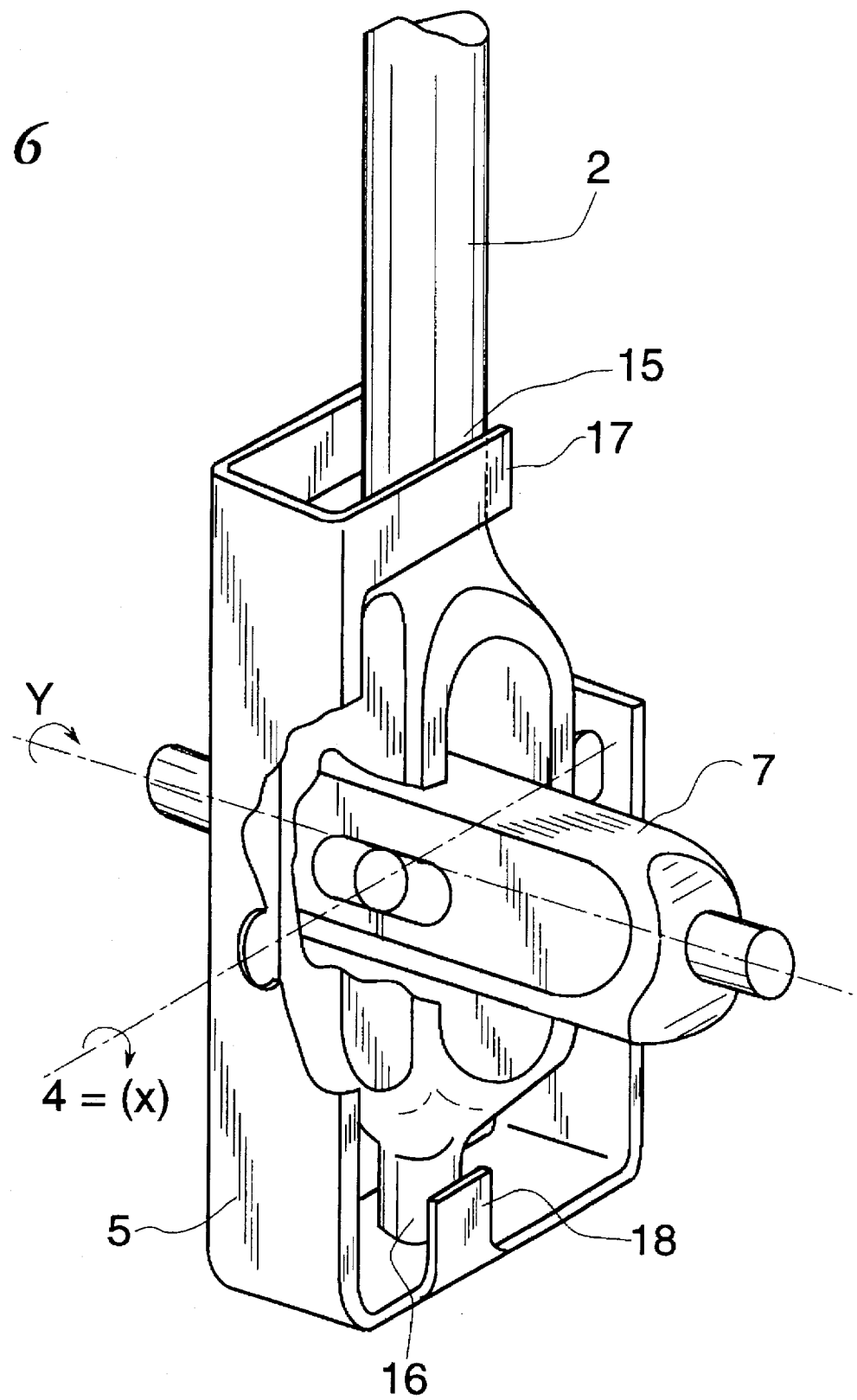
FIG. 6 is a perspective view of a simplified embodiment of the design according to FIGS. 4 and 5.

In the exemplary embodiments shown in FIGS. 4, 5 and 6, a U-shaped yoke is arranged as an intermediate part 5 with its legs directed upward, so that the intermediate part 5 is open at the top. The lower end of the selector lever 2 of a likewise yoke-shaped design is inserted into this intermediate part 5, with legs forming an opening at the top, so that the universal joint mounting of the selector lever 2 with a crosspiece 7 is accommodated within the yoke-shaped area at the lower end of the selector lever 2. In this arrangement, the selector lever 2 has at least one carrier 15 and 16 each in the upper and lower areas of the intermediate part 5, and the said carriers engage holding elements 17 and 18 in an effectively transversely movable manner at the intermediate part in both selection directions in the vertical middle position of the selector lever 2. In addition, a pin 19 engages a recess 20 of the housing 1 in the auxiliary shift position M associated with the manual, stepwise shifting. The pin 19 thus forms the fulcrum point or the pivot axis of the shift lever on the auxiliary shift position M during the stepwise manual shifting. The pin 19 is arranged at the selector lever 2 or its yoke-shaped end, approximately at the level of the shift gate in the housing. In the tilted position associated with this manual shifting, the carriers 15 and 16 do not engage the holding elements 17 and 18 which form a selection gap, so that the selector lever 2 is pivotable around the axis of the pin 19 in relation to the intermediate part 5 in order to make possible the manual shifting described before in connection with the exemplary embodiments shown in FIGS. 1 and 2. A simplified perspective view of such a design is shown in FIG. 6. In this case, a continuous selector lever 2, which is mounted in the intermediate part 5 and in the housing 1 in a universal joint-like manner with a limited movement around the joint axis 4, engages directly between the holding elements 17 of the intermediate part 5 in the middle position above the joint axis 4 and between the holding elements 18 of the intermediate part 5 under the joint axis. The selector lever 2 is released by the holding elements 17 and 18 during a tilting movement, so that it can be pivoted around the X' axis for the manual stepwise shifting. In the embodiment of FIGS. 4, 5 and 6, the holding elements 17 and 18 as well as the pivotability of the selector lever 2 form the selector lever coupling means.

While specific embodiments of the invention have been shown and described in detail to illustrate the application of the principles of the invention, it will be understood that the invention may be embodied otherwise without departing from such principles.

What is claimed is:

1. A shifting device for an automatic transmission of a motor vehicle, the shifting device comprising:
 a housing;
 a shift gate connected to said housing;
 a selector lever movable within said shift gate, said selector lever being pivotable manually into shift positions associated with shifting for stepwise shifting of gears of the automatic transmission;
 a crosspiece pivotably mounted in said housing about a crosspiece axis, said crosspiece including
 locking means with receiving locations laterally offset relative to one another, said receiving locations being associated with said shift positions, and universal joint means, said selector lever being mounted in said universal joint means for pivotal movement about a shifting axis orthogonal to and in a same plane as said crosspiece axis, and for mounting said selector lever in a universal joint-like manner;

spring force means acting on said selector lever at right angles to a longitudinal direction of said shift gate in said shift positions;

an intermediate part pivotably mounted on said housing about an axis, said intermediate part having an upper opening, said selector lever passing through said upper opening;

bearings in said housing for pivotably mounting said intermediate part;

transmission connection means connected to said intermediate part, whereby pivoting movement of said intermediate part results in movement of said transmission connection means; and selector member coupling means for coupling said selector lever to said intermediate member and allowing relative movement between said selector lever and said intermediate member whereby said selector lever is manually pivotable—in an auxiliary shift position of one of said shift positions—around said bearings in a direction of a selection movement for bridging over switching contacts for the stepwise shifting of the gears of the transmission without moving said intermediate part.

2. A shifting device in accordance with claim 1, further wherein said selector lever coupling means includes an electromagnet and a sliding block connected to said intermediate part, said intermediate part being pivotably movably locked in said auxiliary shifting position associated with the manual, stepwise shifting by means of said electromagnet, and crosspiece having a lower part movably engaging said sliding block of said intermediate part at right angles to the direction of the selection movement.

3. A shifting device in accordance with claim 1, wherein said intermediate part includes a yoke with legs mounted on said fixed housing pivotably around said selection axis and a yoke slot, a sliding block being connected to said yoke, said sliding block having a sliding block slot with said sliding block slot extending at right angles to the direction of selection movement, said selector lever passing through said intermediate part slot, said intermediate part slot extending at right angles to a selection movement in an upper web of said yoke, said selector lever engaging—with its lower end, under said selection axis—said sliding block slot.

4. A shifting device in accordance with claim 1, wherein said intermediate part includes a yoke with legs mounted on said fixed housing pivotably around said selection axis and a yoke slot, a sliding block being connected to said yoke, said sliding block having a sliding block transverse slot with said sliding block slot extending at right angles to the direction of selection movement, said selector lever passing through said intermediate part slot extending at right angles to a selection movement in an upper web of said yoke, said selector lever engaging—with its lower end, under said selection axis—said sliding block slot extending in a region above said selection axis whereby said selector lever is moved through said yoke slot in the direction of the selection movement, and is guided with its lower end movably in relation to said yoke in said transverse slot of said sliding block in said auxiliary shift position of said shift position associated with the automatic shifting.

5. A shifting device in accordance with claim 1, wherein said selector lever coupling means includes a housing recess and a pin connected to one of said intermediate part and said selector lever wherein in said auxiliary shift position associated with the manual, stepwise shifting, one of said intermediate part and said selector lever can be pivoted with said pin into said housing recess, at right angles to the longitudinal direction of the shift gate, as a result of which it is locked.

6. A shifting device in accordance with claim 5, wherein in upper and lower areas of said intermediate part, said selector lever has at least one carrier, which engages a holding element in both of the direction of selection movement in a vertical middle position in an effectively transversely movable manner.

7. A shifting device in accordance with one of the claims 1 wherein said intermediate part includes a yoke with legs mounted on said fixed housing pivotably around said selection axis, said selector lever includes a U-shaped area with legs and said universal joint-like mounting means is arranged between said legs of said U-shaped area of said selector lever, and said U-shaped area is arranged between the legs of a yoke-shaped intermediate part.

8. A shifting device in accordance with claim 7, wherein said selector lever coupling means includes providing said selector lever mounted tiltably at right angles to a selection gap, having a carrier each above a tilt axis and under said tilt axis, and said carriers engage holding elements at said intermediate part, wherein said selector lever is freely movably in a tilt position associated with the manual shifting and transversely movably in a vertical middle position.

\* \* \* \* \*